(12) United States Patent
Noh et al.

(10) Patent No.: US 7,620,293 B2
(45) Date of Patent: Nov. 17, 2009

(54) METHOD AND APPARATUS FOR CONTROLLING A BIT RATE OF DIGITAL VIDEO DATA

(75) Inventors: Kyung-Heon Noh, Suwon-si (KR); She-Woong Jeong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 936 days.

(21) Appl. No.: 10/830,022

(22) Filed: Apr. 23, 2004

(65) Prior Publication Data
US 2004/0213551 A1    Oct. 28, 2004

(30) Foreign Application Priority Data
Apr. 24, 2003    (KR) ............... 10-2003-0026069

(51) Int. Cl.
*H04N 5/91* (2006.01)
(52) U.S. Cl. ................................ 386/68; 386/111
(58) Field of Classification Search ............ 386/68, 386/111
See application file for complete search history.

(56) References Cited

U.S. PATENT DOCUMENTS

| | | | | |
|---|---|---|---|---|
| 5,742,347 A | * | 4/1998 | Kandlur et al. | 375/240.25 |
| 7,372,903 B1 | * | 5/2008 | Lee et al. | 375/240 |
| 2002/0003837 A1 | * | 1/2002 | Kudou | 375/240.02 |
| 2003/0012561 A1 | * | 1/2003 | Willis | 386/111 |

FOREIGN PATENT DOCUMENTS

| | | |
|---|---|---|
| JP | 08-102913 | 4/1996 |
| JP | 10-032787 | 2/1998 |
| JP | 11-341435 | 12/1999 |
| JP | 2000-175151 | 6/2000 |

* cited by examiner

*Primary Examiner*—Thai Tran
*Assistant Examiner*—Girumsew Wendmagegn
(74) *Attorney, Agent, or Firm*—Harness, Dickey & Pierce, P.L.C.

(57) ABSTRACT

An apparatus and method for receiving a stream of digital video data including at least one group of pictures containing at least two different types of pictures. The apparatus and method determine a bit rate, using the size information from a picture of a first type contained in a first subgroup within a group of pictures received, and use the determined bit rate to set at least one bit rate for a next subgroup of pictures, and convert the second type of pictures into the first type of pictures for a reverse play operation using the set bit rates.

20 Claims, 5 Drawing Sheets

METHOD AND APPARATUS FOR CONTROLLING A BIT RATE OF DIGITAL VIDEO DATA

CROSS-REFERENCE TO RELATED APPLICATIONS

This application claims priority from Korean Patent Application No. 10-2003-0026069, filed on Apr. 24, 2003, in the Korean Intellectual Property Office (KIPO), the entire contents of which are incorporated herein by reference.

BACKGROUND OF THE INVENTION

1. Field of the Invention

The present invention relates to digital video play apparatuses and more specifically to an apparatus and method for controlling bit rates of a digital video stream in a reverse play operation.

2. Description of the Related Art

Generally, Moving Picture Experts Group (MPEG) digital video play apparatuses receive a digital video stream from digital storage media (DSM), such as digital versatile discs (DVDs), digital video cassette recorders (DVCRs), and hard disk drives (HDDs), in order to play the digital video stream or perform various trick-play functions. Trick-play functions may include a fast forward, a slow forward, a fast reverse, and a slow reverse.

The types of picture that may be found in a MPEG display stream include an intra-coded picture (I-picture), a predictive-coded picture (P-picture), and a bidirectionally predictive-coded picture (B-picture). The I-picture may be encoded by a discrete cosine transform (DCT) without using motion compensation. The P-picture may be encoded by performing motion compensation on the basis of an I-picture or another P-picture and then applying a DCT to the remainder. B-pictures may be processed different from P-pictures with respect to motion compensation. For a B-picture, two frames one before and one after a current frame may be used.

In MPEG-2 standards, a picture sequence has a structure of I, B, B, P, B, B, . . . , P, B, B, etc. A first I-picture to a picture prior to a next I-picture is referred to as a group of pictures (GOP). In addition, if a number of pictures in the GOP may be defined as "N", a number of pictures between I- and P-pictures or between P- and P-pictures (i.e., a picture period) may be defined as "M." N and M may be variable in one video sequence. If a picture period of any GOP is, for example, three, the picture sequence may have a structure of I, B, B, P, B, B, P, B, B . . . . If a picture period is two, the picture sequence may have a structure of I, B, P, B, . . . where the number of pictures also varies.

Various problems may arise due to a difficulty of identifying accurate information from the group of pictures of a digital video stream during reverse play (fast or slow), because the GOP may have a varying structure with respect to a type, a period and a number of the pictures.

General video play apparatuses do not necessarily use an I-frame encoder due to their complex construction. Instead, the video play apparatuses may store raw data in a memory unit to use in a reverse play which may require more and/or larger memory units.

SUMMARY OF THE INVENTION

Exemplary embodiments of the present invention provide a method and apparatus for controlling a bit rate during a reverse play of a digital video stream, which can decode a group of pictures containing more than one picture type.

An exemplary embodiment of the present invention provides an apparatus for controlling a bit rate during a reverse play operation including a sorting unit for receiving a group of pictures and sorting the intra-coded, predictive-coded and the bidirectionally predictive-coded pictures from the group of pictures received, and a determining unit for determining a bit rate from a first subgroup of pictures contained in the group of pictures, and using the determined bit rate for the next subgroups of pictures, and an intra-frame encoding unit for converting the predictive-coded pictures into intra-coded pictures for a reverse play using the determined bit rate, a storing unit for storing the intra-coded, converted intra-coded, and the bidirectionally predictive-coded pictures received from the sorting unit, and a decoding unit for decoding and outputting the intra-coded, the converted intra-coded, and the bidirectionally predictive-coded pictures. Exemplary embodiments of the present invention provide an apparatus where the determining unit sets a bit rate with respect to a state of the storing unit and the determined bit rate.

Exemplary embodiments of the present invention provide an apparatus where the state of the storing unit is a remaining capacity of the storing unit.

Exemplary embodiments of the present invention provide an apparatus where the determining unit is included in the intra-frame encoding unit.

Exemplary embodiments of the present invention provide an apparatus where the storing unit includes a bidirectionally predictive-coded frame memory for storing the bidirectionally predictive-coded pictures received from the sorting unit and an intra-coded frame memory for storing the intra-coded and the converted intra-coded pictures received from the sorting unit.

Exemplary embodiments of the present invention provide an apparatus including a buffer linker containing pointing information, and for outputting the pictures stored in the storing unit to the decoding unit in a reverse play order.

An exemplary embodiment of the present invention provides a method for controlling the bit rates of a plurality of pictures in a group of pictures including sorting out intra-coded, predictive-coded and bidirectionally predictive-coded pictures from the received group of pictures, determining the size information from an intra-coded picture of a first subgroup of pictures contained in the group of pictures received, and determining a bit rate from the size information, and setting bit rates required for encoding the predictive-coded pictures into intra-coded pictures of a next subgroup of pictures in the group of pictures, using the set bit rates.

Exemplary embodiments of the present invention provide a method where the setting of the bit rates is performed with respect to the size information and the state of the storing unit.

Exemplary embodiments of the present invention provide a method where the bit rates are determined using the bit rate of an intra-coded picture of the first subgroup of pictures in each corresponding group of pictures.

Exemplary embodiments of the present invention provide a method including storing the encoded intra-coded pictures in a storing unit and decoding the encoded intra-coded pictures and outputting the decoded pictures in a reverse play order.

Another exemplary embodiment of the present invention provides a method and apparatus for receiving a stream of digital video data including at least one group containing at least two different types of pictures, determining at least one bit rate using size information from a picture of a first type contained in a first subgroup within the at least one group of pictures received and setting the at least one bit rate for next subgroups of pictures, and converting the second type of pictures into the first type of pictures for a reverse play operation using the set at least one bit rate.

Another exemplary embodiment of the present invention provides a method and apparatus for an encoder, which includes receiving a first picture type used to set a bit rate corresponding to the size information of a second picture type, and converting the first picture type into the second picture type using the set bit rate.

Another exemplary embodiment of the present invention provides a method and apparatus for playing a video, which includes receiving a stream of digital video data including at least one group containing at least two different types of pictures, determining at least one bit rate using size information from a picture of a first type contained in a first subgroup within the at least one group of pictures received, setting the at least one bit rate for next subgroups of pictures, converting the second type of pictures into the first type of pictures for a reverse play operation using the set bit rate, and displaying the received first type of pictures and the converted pictures for a reverse image output according to a reverse display procedure.

BRIEF DESCRIPTION OF THE DRAWINGS

Exemplary embodiments of the present invention will become more apparent by describing in detail exemplary embodiments thereof with reference to the attached drawings in which.

DETAILED DESCRIPTION OF EXEMPLARY EMBODIMENTS OF THE INVENTION

Exemplary embodiments of the present invention will now be described more fully with reference to the accompanying drawings, in which exemplary embodiments of the invention are shown.

Figure 1:
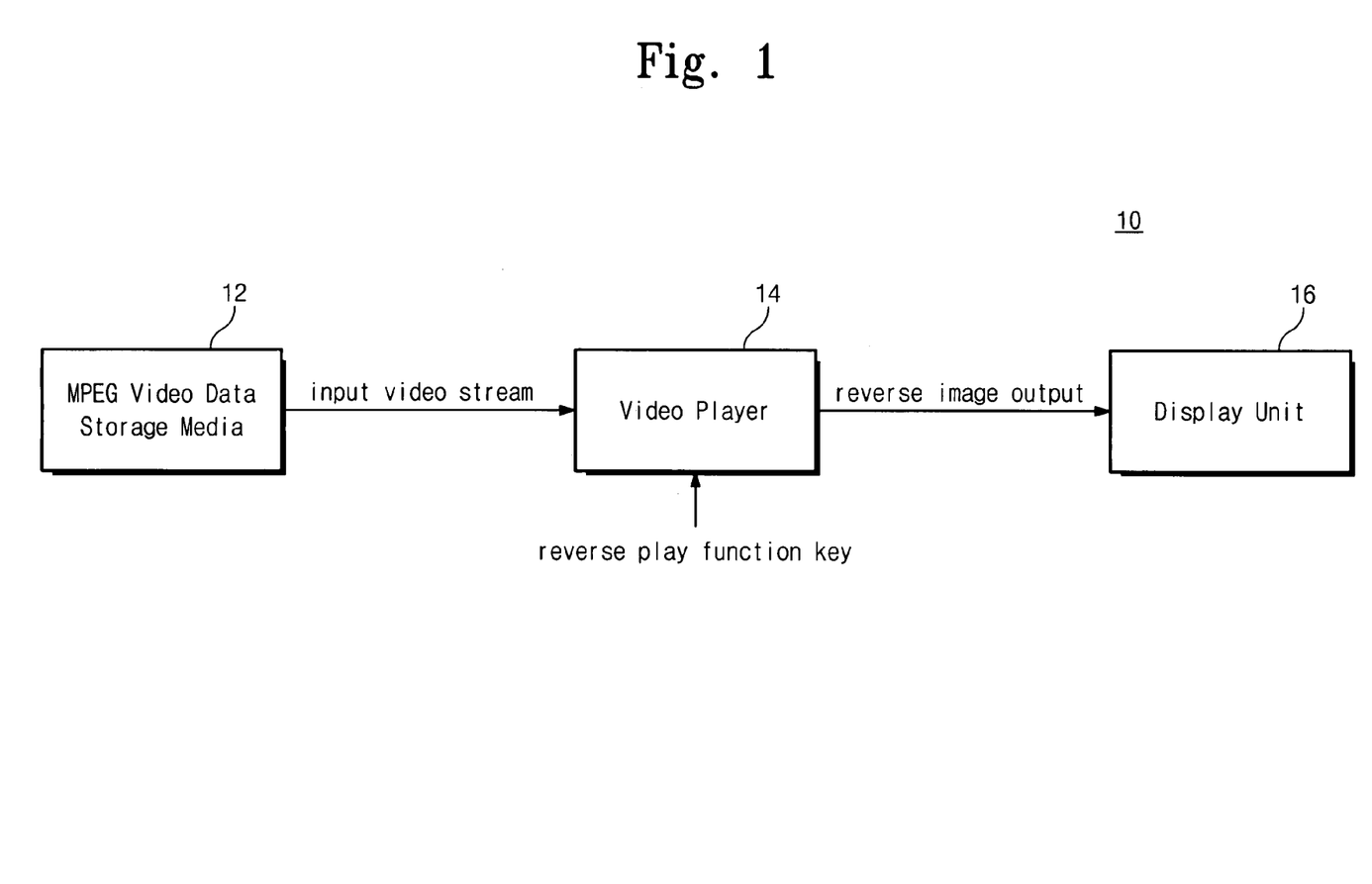
FIG. 1 is a functional block diagram showing a video play apparatus for a reverse play of a digital video steam according to an exemplary embodiment of the present invention.

According to an exemplary embodiment of the present invention, FIG. 1 is a functional block diagram showing a video play apparatus 10. Referring to FIG. 1, the video play apparatus 10 includes a video player 14, which receives an input video stream from a digital video data storage media 12, as a group of pictures (GOP), each including a plurality of pictures. The input video stream (i.e., encoded data) may be reproduced by decoding in the video player 14 and then transferring the decoded image to a display unit 16.

If the video player 14 receives a signal from a reverse play function key (for example, either by pressing or remote control), the video player 14 performs a reverse play function in response to the key by displaying a group of pictures.

The video player 14 controls a data conversion for a reverse play from the input video stream and a bit rate of the data, to provide a reverse image output according to a reverse display procedure of the display unit 16.

Figure 2:
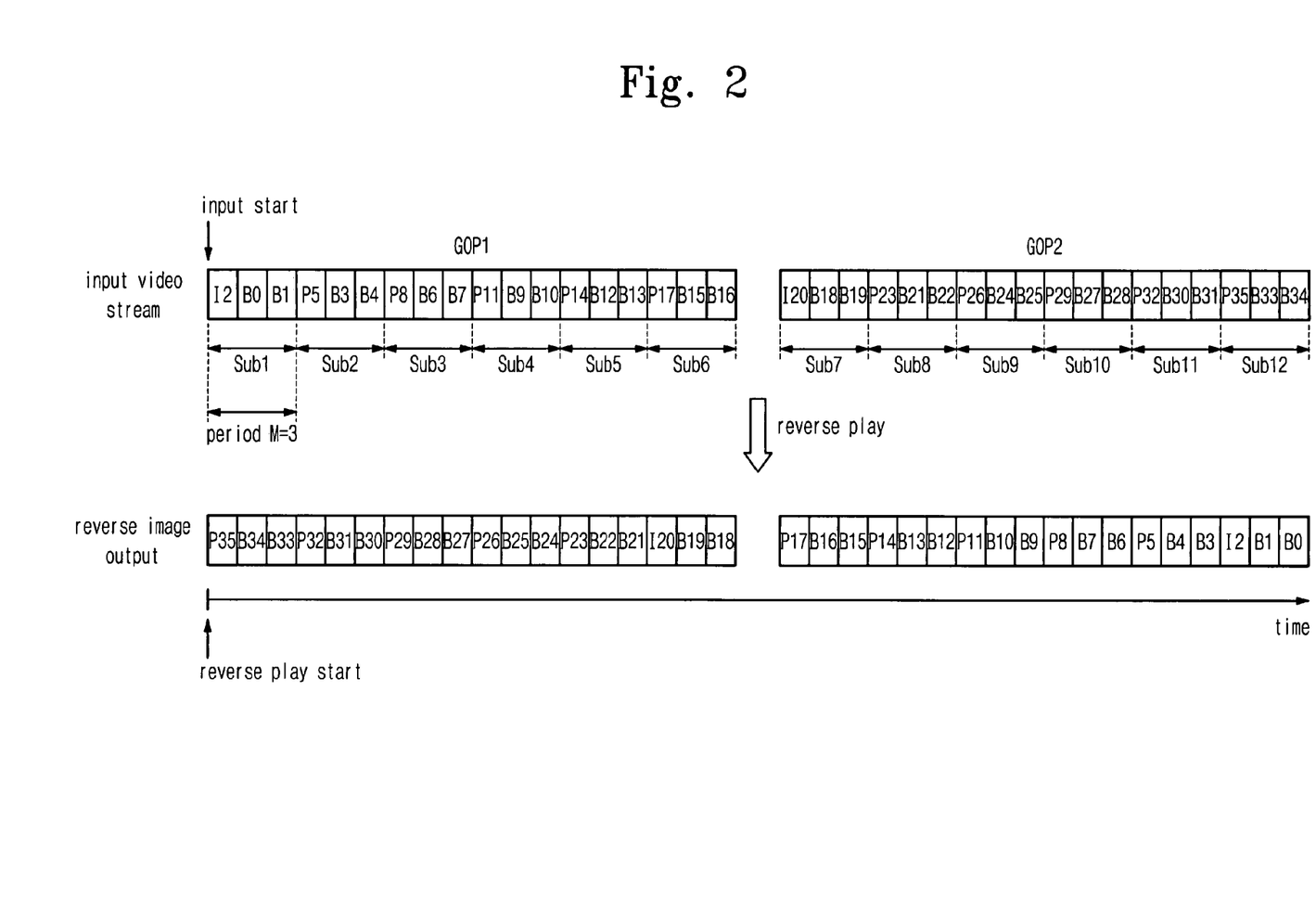
FIG. 2 is an exemplary detailed view showing an encoded input digital video stream and a reverse image output corresponding to FIG. 1.

FIG. 2 is a detailed view showing an input digital video stream received from the digital video data storage media 12 and a reverse image output generated during a reverse play illustrated in FIG. 1, and in accordance with an exemplary embodiment of the present invention.

Referring to FIG. 2, the input video stream and the reverse image output contain, for example, two groups of pictures GOP1 and GOP2. Each of the groups of pictures GOP1 and GOP2 are divided into a plurality of subgroups of pictures sub1~sub12. For example, if a period of pictures M is three, each of the subgroups of pictures sub1~sub12 may contain one I or P-picture and two B-pictures.

The input digital video stream may be serially inputted to the video player 14 according to a given transmission procedure. If the reverse play function key is activated, the video player 14 serially provides the reverse image output to the display unit 16. In this case, the video player 14 may decode the currently inputted group of pictures GOP2 during a reverse play, and decode the previously inputted group of pictures GOP1 at the same time.

For a reverse play operation, the inputted I-pictures and B-pictures may be stored in a frame memory. The P-pictures may be converted to I-pictures using a bit rate of the I-pictures. Since the P-pictures in the group of pictures are composed of similar scenes to the I-picture at the head of the identical group of pictures, the pictures in an identical picture group have similar complexity (because there is probably not much shift in scenes within the group of pictures). Therefore, a targeted bit rate of pictures inputted to an I-frame encoder may be set with respect to the information of the I-picture at the head of the group of pictures during a reverse play. Then, the P-pictures may be converted into I-pictures using the set bit rate and may be stored in a buffer memory. The stored I-pictures may be read from the buffer memory according to a procedure of display and are decoded in a video decoder.

Figure 3:
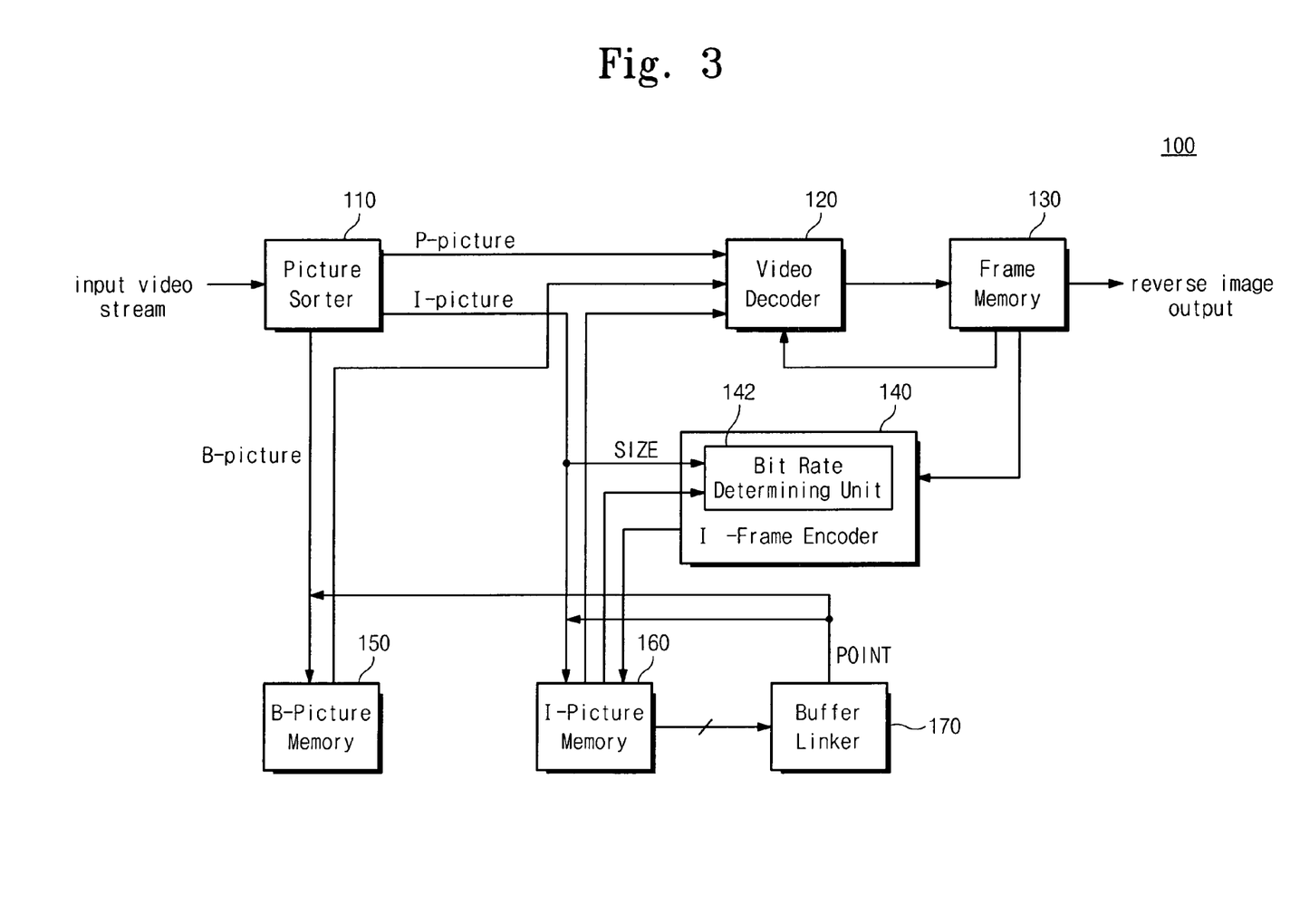
FIG. 3 is a block diagram showing a digital video play apparatus for a reverse play according to an exemplary embodiment of the present invention.

FIG. 3 is a block diagram showing a digital video play apparatus 100 for a reverse play according to an exemplary embodiment of the present invention.

Referring to FIG. 3, the video play apparatus 100 includes an I-frame encoder 140 including a bit rate determining unit 142. The video play apparatus 100 may also include a picture sorter 110, a video decoder 120 and/or a frame memory 130. In addition, the video play apparatus 100 may include a B-picture (or frame) memory 150, an I-picture (or frame) memory 160 and/or a buffer linker 170.

The picture sorter 110 may sort I-pictures, B-pictures, and P-pictures from the input video stream and output the pictures. That is, the picture sorter 110 may output the sorted I-pictures to an I-picture memory 160 and an I-frame encoder 140, the B-pictures to a B-picture memory 150, and the P-pictures to the video decoder 120, according to an exemplary embodiment of the present invention.

The video decoder 120 may decode the input video stream for a play operation (for example, by means of a MPEG decoding unit) and may transfer the decoded image to the frame memory 130. The video decoder 120 may decode the encoded P-picture from the picture sorter 110 and may transfer the decoded image to a frame memory 130 during a reverse play operation, according to an exemplary embodiment of the present invention. MPEG decoding units are well known to those skilled in the art and will not be explained in further detail.

The frame memory 130, according to an exemplary embodiment of the present invention, serially outputs the decoded video stream from the video decoder 120 to the display unit 16, and receives a reverse play stream outputted from the reverse video of the video decoder 120 to be stored, and serially outputs the decoded video to the display unit 16. In this case, the frame memory 130 may transfer the decoded P-pictures to the I-frame encoder 140.

Figure 4:
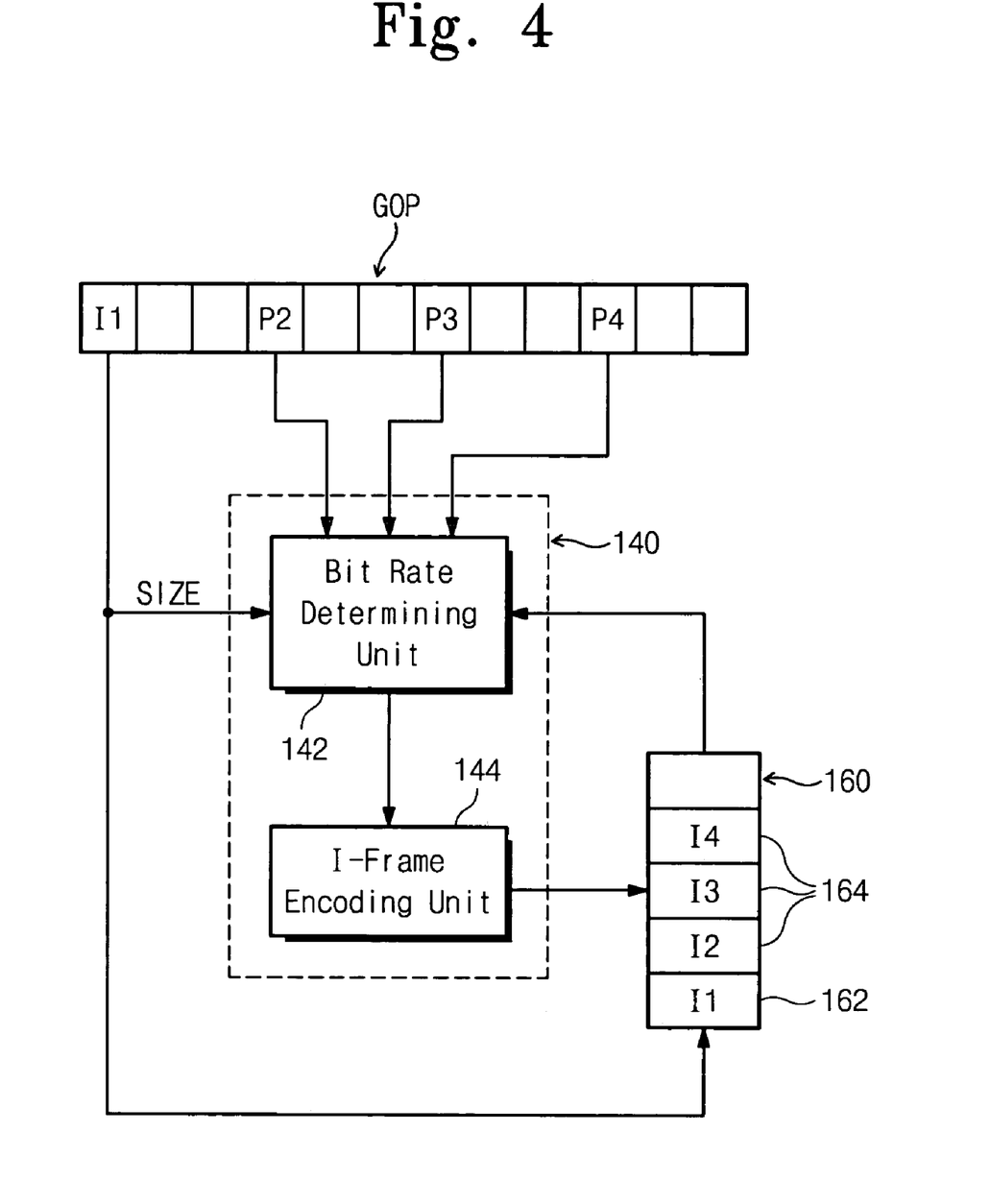
FIG. 4 is an exemplary block diagram showing a portion of the digital video play apparatus for controlling a bit rate during the reverse play.

The I-frame encoder 140, according to an exemplary embodiment of the present invention, may include a bit rate determining unit 142 and an I-frame encoding unit 144, as illustrated in FIG. 4. The bit rate determining unit 142 may receive the decoded P-pictures from the frame memory 130 to set a bit rate corresponding to the size information of the I-pictures. The I-frame encoding unit 144 may convert the decoded P-pictures into I-pictures using the determined bit rate and output the converted I-pictures to the I-picture memory 160.

The buffer linker 170, according to an exemplary embodiment of the present invention, may generate pointing information (POINT) for outputting the B-pictures stored in the B-picture memory 150, and the I-pictures stored in the I-picture memory 160, to the video decoder 120 according to a procedure of a reverse play operation.

According to an exemplary embodiment of the present invention, if the video play apparatus 100, for example, prepares previous groups of pictures in a memory unit beforehand for a seamless smooth reverse play, the input video stream may be inputted in an order of I, B, and P-picture types. The I-pictures may be stored in the I-picture memory 160 without the video decoder 120. The P-pictures may be converted into the I-pictures by the video decoder 120, and outputted to the frame memory 130 and the I-frame encoder 140, and are then stored in the I-picture memory 160, while the B-pictures are stored in the B-picture memory 150.

When the decoded P-pictures are read from the frame memory 130 and are converted into I-pictures, a targeted bit rate may be determined using size information of an I-picture at the head of the GOP. In this case, the targeted bit rate may be set with respect to a residual capacity by discriminating a state of I-picture memory 160, which may be expressed by the following exemplary Equation 1.

Targeted bit rate $(I2)$=Size $(I1) \pm a$ <Equation 1>

In the above equation, the targeted bit rate I2 is a targeted bit rate used in a bit rate determining unit 142, while converting the P-picture of the next group of pictures in an identical group of pictures to an I-picture. The size I1 may indicate a bit rate of the I-picture at the head of the group of pictures. The "a" may represent a state of the buffer where the I-picture is stored. The "a" may add or subtract a proper size to the targeted bit rate according to a remaining capacity of the buffer. If the size I1 is 80 kilobits per second (kbps), for instance, the targeted bit rate I2 is 80 kbps. However, the targeted bit rate I2 can be set in a range of 30 kbps to 120 kbps, corresponding to a state of the buffer.

According to an exemplary embodiment of the present invention, the targeted bit rate of the P-picture in an identical group of pictures is determined corresponding to the information of an I-picture. In this case, it is possible that the targeted bit rate should be added or subtracted with reference to the size of the prepared buffer. For instance, if there are large I-pictures continuously inputted at the head of a group of pictures, the number of I-pictures decoded and stored in a buffer can be reduced, such that the targeted bit rate that is decoded may be adjusted with respect to a state of the buffer to maintain a specific number. Therefore, a seamless smooth reverse play can be implemented.

As described above, in an exemplary embodiment of the present invention, the targeted bit rates of the input pictures received by the I-frame encoder 140 are set with reference to the size of the I-picture at the head of a group of pictures, because the pictures in the group may have similar complexity and/or a smaller shift. That is, the procedure of converting a P-picture to an I-picture may be performed within a frame having similar pictures, such that a targeted bit rate can be effectively achieved by means of the already existing I-picture at the head of the group of pictures encoded in the frame, and without added processing or calculations.

Figure 5:
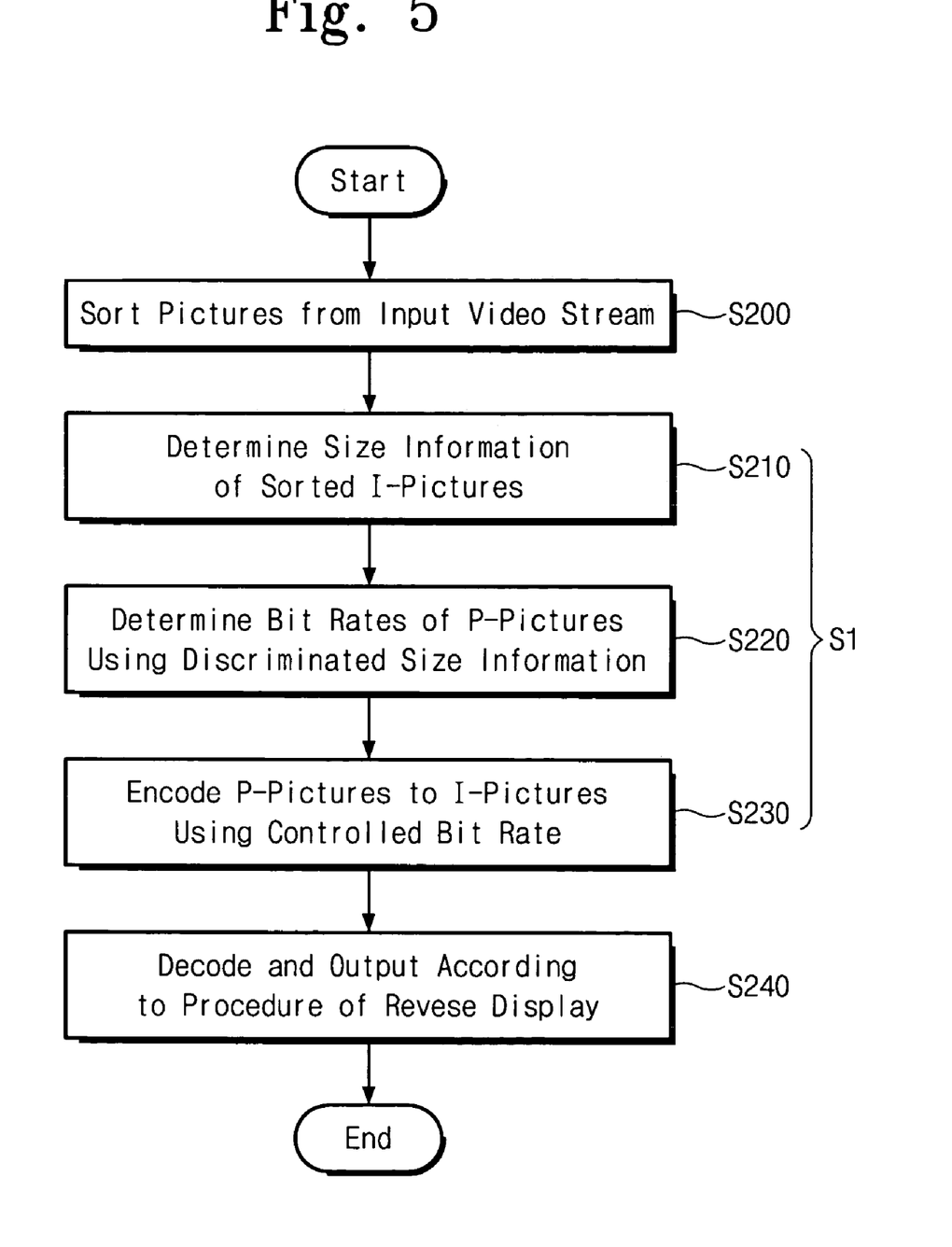
FIG. 5 is an exemplary flow diagram showing a method of data processing during the reverse play.

FIG. 5 illustrates an exemplary method for controlling a bit rate during a reverse play operation, for example, by a video play apparatus. The procedure may be a software program that the video play apparatus 100 executes. For example, step S1, illustrated in the drawing, could be a program included in and performed by the I-frame encoder.

Referring to FIG. 5, in an exemplary embodiment of the present invention, the video play apparatus 100 may receive the encoded digital video stream as a group of pictures (GOP) from the digital video data storage media, and sort out I-pictures, P-pictures and B-pictures (for example, by the picture sorter 110) in step S200. In step S210, the I-pictures of the sorted pictures from step S200 may be output to the I-frame encoder 140 and the I-picture memory 160. The P-pictures may be provided to the I-frame encoder 140 through the video decoder 120 and the frame memory 130, and the B-pictures may be stored in the B-picture memory 150. The bit rate determining unit 142, in the I-frame encoder 140, may determine the size information of the I-picture at the head of the first subgroup of pictures and control the bit rates of the P-pictures of the next subgroup of pictures using the size information in step S220. That is, the bit rate determining unit 142 may determine the size information (SIZE) from the I-picture of the first subgroup of pictures, and set the bit rates of the P-pictures in response to the determined bit rate while the P-pictures of the subgroup of pictures are converted into I-pictures.

Referring to FIG. 5, in an exemplary embodiment of the present invention, step S230 may convert the P-pictures into I-pictures using the set bit rates, and store the converted I-pictures in the I-picture memory 160. In step S240, the I-pictures (and the I-pictures converted from the P-pictures) stored in the I-picture memory 160 and the B-pictures stored in the B-picture memory 150 are provided to the video decoder 120 in a reverse display order using pointing information (POINT) from a buffer linker 170. The pictures may then be decoded, and the reverse video image data may then be output according to the reverse display procedure.

As described above, in an exemplary embodiment, the digital video stream play apparatus controls a bit rate of a P-picture using the size information of an I-picture to play the reverse video stream simply by using an I-frame encoder.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for controlling a bit rate during reverse play of a digital video stream decoded by at least one group of pictures including subgroups of pictures having a plurality of pictures and a picture period, the apparatus comprising:

a sorting unit for receiving the at least one group of pictures and sorting intra-coded pictures, predictive-coded pictures, and bidirectionaliy predictive-coded pictures from the received at least one group of pictures;

a determining unit for determining a bit rate using size information from an intra-coded picture of a first subgroup of pictures in the at least one group of pictures received from the sorting unit, and for setting bit rates of next subgroups of pictures using the determined bit rate;

an intra-frame encoding unit for converting the predictive-coded pictures into intra-coded pictures for the reverse play using the set bit rates;

a storing unit for storing the intra-coded pictures received from the sorting unit, the converted intra-coded pictures received from the intra-frame encoding unit, and the bidirectionally predictive-coded pictures received from the sorting unit; and a decoding unit for decoding and outputting the intra-coded pictures, the converted intra-coded pictures, and the bidirectionally predictive-coded pictures received from the storing unit.

2. The apparatus of claim 1, wherein the determining unit sets the bit rates with respect to a state of the storing unit and the determined bit rate.

3. The apparatus of claim 2, wherein the state of the storing unit is a remaining capacity of the storing unit.

4. The apparatus of claim 1, wherein the determining unit is part of the intra-frame encoding unit.

5. The apparatus of claim 2, wherein the determining unit is part of the intra-frame encoding unit.

6. The apparatus of claim 1, wherein the storing unit comprises:

a bidirectionally predictive-coded frame memory for storing the bidirectionally predictive-coded pictures received from the sorting unit; and an intra-coded frame memory for storing the intra-coded pictures received from the sorting unit and the converted intra-coded pictures received from the intra-frame encoding unit.

7. The apparatus of claim 1, further comprising a buffer linker containing pointing information for outputting the pictures stored in the storing unit to the decoding unit in a reverse play order.

8. A method of controlling bit rates of a plurality of pictures in a group of pictures while a video stream including at least one group of pictures is reverse played in a digital video play apparatus, the method comprising:

sorting intra-coded pictures, predictive-coded pictures, and bidirectionally predictive-coded pictures from the group of pictures;

determining size information from an intra-coded picture of a first subgroup of pictures in the group of pictures;

determining a bit rate from the size information;

setting bit rates required for converting the predictive-coded pictures of next subgroups of pictures contained in the group of pictures into intra-coded pictures, using the determined bit rate; and converting the predictive-coded pictures into intra-coded pictures using the set bit rates.

9. The method of claim 8, wherein setting bit rates is performed with respect to the size information and a state of a storing unit.

10. The method of claim 8, wherein the bit rates of the next subgroups of pictures are determined using the determined bit rate of an intra-coded picture of the first subgroup of pictures in each corresponding group of pictures.

11. The method of claim 8, further comprising:
storing the converted intra-coded pictures;
decoding the converted intra-coded pictures; and
outputting the decoded pictures in a reverse play order.

12. A method, comprising:
receiving a stream of digital video data including at least one group containing at least two different types of pictures;

determining at least one bit rate using size information from a picture of a first type of pictures contained in a first subgroup within the at least one group of pictures received;

setting the at least one bit rate for next subgroups of pictures; and converting a second type of pictures into the first type of pictures for a reverse play operation using the set at least one bit rate.

13. An apparatus, comprising:
a sorting unit for receiving a stream of digital video data including at least one group containing at least two different types of pictures and for sorting the at least two different types of pictures from the at least one group of pictures received;

a determining unit for determining at least one bit rate using size information from a picture of a first type of pictures contained in a first subgroup within the at least one group of pictures received and for setting the at least one bit rate for next subgroups of pictures; and an encoding unit for converting a second type of pictures into the first type of pictures for a reverse play operation using the set at least one bit rate.

14. An encoder for receiving a first picture type used in order to set a bit rate corresponding to size information of the first picture type and converting a second picture type into the first picture type using the set bit rate, the encoder comprising:

a determining unit configured to receive the first picture type in order to set the bit rate corresponding to the size information of the first picture type; and an encoding unit configured to convert the second picture type into the first picture type using the set bit rate.

15. A video player apparatus, comprising:
a video player that receives a stream of digital video data including at least one group containing at least two different types of pictures from a digital video storage media, determines at least one bit rate using size information from a picture of a first type of pictures contained in a first subgroup within the at least one group of pictures received, sets the at least one bit rate for next subgroups of pictures, and converts a second type of pictures into the first type of pictures for a reverse play operation using the set at least one bit rate; and a display unit that receives the first type of pictures and the converted pictures and provides a reverse image output according to a reverse display procedure.

16. A method, comprising:
receiving a stream of digital video data including at least one group containing at least two different types of pictures;

determining at least one bit rate using size information from a picture of a first type of pictures contained in a first subgroup within the at least one group of pictures received;

setting the at least one bit rate for next subgroups of pictures;

converting a second type of pictures into the first type of pictures for a reverse play operation using the set at least one bit rate; and displaying the received first type of pictures and the converted pictures for a reverse image output according to a reverse display procedure.

17. A video player apparatus for performing the method of claim 16, the video player apparatus comprising:

a video player that receives the stream of digital video data including the at least one group containing the at least two different types of pictures from a digital video storage media, determines the at least one bit rate using the size information from the picture of the first type of pictures contained in the first subgroup within the at least one group of pictures received, sets the at least one bit rate for the next subgroups of pictures, and converts the second type of pictures into the first type of pictures for the reverse play operation using the set at least one bit rate; and a display unit that receives the first type of pictures and the converted pictures and provides the reverse image output according to the reverse display procedure.

18. An apparatus for controlling a bit rate during a reverse play of a digital video stream decoded by at least one group of pictures including subgroups of pictures having a plurality of pictures and a picture period, the apparatus performing the method of claim 8, the apparatus comprising:

a sorting unit for receiving the at least one group of pictures and sorting the intra-coded pictures, the predictive-coded pictures, and the bidirectionally predictive-coded pictures from the received at least one group of pictures;

a determining unit for determining the bit rate that uses the size information from the intra-coded picture of the first subgroup of pictures in the group of pictures received from the sorting unit, and for setting the bit rates of the next subgroups of pictures using the determined bit rate;

an intra-frame encoding unit for converting the predictive-coded pictures into intra-coded pictures for the reverse play using the set bit rates;

a storing unit for storing the intra-coded pictures received from the sorting unit, the converted intra-coded pictures received from the intra-frame encoding unit, and the bidirectionally predictive-coded pictures received from the sorting unit; and a decoding unit for decoding and outputting the intra-coded pictures, the converted intra-coded pictures, and the bidirectionally predictive-coded pictures received from the storing unit.

19. An apparatus, comprising:

a determining unit configured to receive a first picture type, wherein the first picture type is used in order to set a bit rate corresponding to size information of the first picture type;

an encoding unit for converting a second picture type into the first picture type using the set bit rate; and a sorting unit for receiving a stream of digital video data including at least one group of pictures containing at least two different types of pictures and for sorting the at least two different types of pictures from the at least one group of pictures received;

wherein the determining unit determines the bit rate using the size information of the first picture type contained in a first subgroup within the at least one group of pictures received and sets the bit rate for next subgroups of pictures.

20. A video player apparatus, comprising:

a determining unit configured to receive a first picture type, wherein the first picture type is used in order to set a bit rate corresponding to size information of the first picture type;

an encoding unit for converting a second picture type into the first picture type using the set bit rate;

a sorting unit for receiving a stream of digital video data including at least one group of pictures containing at least two different types of pictures and for sorting the at least two different types of pictures from the at least one group of pictures received, wherein the determining unit determines the bit rate using the size information of the first picture type contained in a first subgroup within the at least one group of pictures received and sets the bit rate for next subgroups of pictures;

a video player that receives the stream of digital video data including the at least one group of pictures containing the at least two different types of pictures from a digital video storage media, determines the bit rate using the size information of the first picture type contained in the first subgroup within the at least one group of pictures received, sets the bit rate for the next subgroups of pictures, and converts the second type of pictures into the first type of pictures for reverse play operation using the set bit rate; and a display unit that receives the first type of pictures and the converted pictures, and provides a reverse image output according to a reverse display procedure.

\* \* \* \* \*